(12) United States Patent  
Nishizawa

(10) Patent No.: US 7,948,656 B2  
(45) Date of Patent: May 24, 2011

(54) IMAGE PROCESSING APPARATUS

(75) Inventor: Akinori Nishizawa, Kyoto (JP)

(73) Assignee: Murata Machinery, Ltd., Kyoto-shi (JP)

(*) Notice: Subject to any disclaimer, the term of this patent is extended or adjusted under 35 U.S.C. 154(b) by 536 days.

(21) Appl. No.: 12/103,339

(22) Filed: Apr. 15, 2008

(65) Prior Publication Data

US 2008/0259409 A1    Oct. 23, 2008

(30) Foreign Application Priority Data

Apr. 20, 2007    (JP) ................. 2007-111159

(51) Int. Cl.  
*H04N 1/40*    (2006.01)

(52) U.S. Cl. ................. 358/2.1; 358/1.2; 358/504

(58) Field of Classification Search ............... 358/1.9, 358/2.1, 1.2, 3.01, 3.06, 3.13–3.14, 500, 358/504, 400; 382/162, 166  
See application file for complete search history.

(56) References Cited

U.S. PATENT DOCUMENTS

| 7,085,006 B2* | 8/2006 | Yokoyama et al. ............ 358/1.9 |
| 2009/0141320 A1* | 6/2009 | Minamino .................... 358/512 |

FOREIGN PATENT DOCUMENTS

| JP | 2003-101797 A | 4/2003 |
| JP | 2005-303835 A | 10/2005 |

* cited by examiner

*Primary Examiner* — Thomas D Lee  
*Assistant Examiner* — Stephen M Brinich  
(74) *Attorney, Agent, or Firm* — Westerman, Hattori, Daniels & Adrian, LLP

(57) ABSTRACT

A method of controlling an image processing apparatus comprising the steps of: generating color reduced image data from the color image data; generating monochrome reduced image data from the monochrome image data; and determining the order of generation of the color or monochrome reduced image data when generating both the color reduced image data and the monochrome reduced image data for display.

11 Claims, 5 Drawing Sheets

IMAGE PROCESSING APPARATUS

CROSS-REFERENCE TO RELATED APPLICATIONS

This application claims priority under 35 U.S.C. 119 to Japanese Patent Application No. 2007-111159, filed on Apr. 20, 2007, which application is hereby incorporated by reference its in entirety.

BACKGROUND OF THE INVENTION

1. Field of the Invention

The present invention relates to an image processing apparatus and, more specifically, to an image processing apparatus having a function to display a thumbnail image which includes reduced image data.

2. Description of Related Art

In an image processing apparatus such as a digital multi-function peripheral having a copying function, a facsimile function, a printer function and a scanner function, there is a type in which a user is able to select and execute one of color image processing and monochrome image processing on the basis of image data of a document scanned by a scanner. In such the image processing apparatuses, the user selects either one of the color image processing and the monochrome image processing before starting scanning of the document.

However, when the user selects one of the color image processing and the monochrome image processing to be executed before starting the scanning of the document in this manner, an image to be printed (an image after processing) on a printing paper after having executed the image processing to be executed subsequently cannot be previewed by the user. Therefore, there is an apparatus which displays a thumbnail image of images on the basis of the image data for monochrome output and images on the basis of the image data for color output on a display unit after having scanned the document, and allows the user to select one of these images to be printed.

On the other hand, some digital multifunction peripherals include a function to transmit the image data through an internet facsimile. When executing the internet facsimile transmission, the image data is converted to have a file format which is attachable to electronic mails by a codec to prepare an attachment file for the electronic mails. Then, a mail attached with the prepared attachment file is transmitted. However, since the color image data includes a large quantity of data, when an attempt is made to transmit the color image data through the internet facsimile, the size of the color image is changed, that is, the image data is reduced in size before transmission.

Some digital multifunction peripherals have a function to transmit a requested image to a personal computer connected via a LAN or the like upon reception of a request from the personal computer to transmit images accumulated in the digital multifunction peripheral. When a thumbnail image of the images accumulated in the digital multifunction peripheral is requested, the digital multifunction peripheral of this type prepares and transmits the thumbnail image of the requested images.

BRIEF SUMMARY OF THE INVENTION

As described above, in the image processing apparatus, a thumbnail image of images on the basis of image data for monochrome output and images on the basis of image data for color output are displayed on the display unit. In such the image processing apparatus, when preparing thumbnail data, whether the image data is monochrome or color is not distinguished. In other words, a thumbnail image preparing process is performed in a predetermined sequence such as ascending order or descending order in a folder.

However, in order to avoid corpulence of the system, or for the purpose of cost reduction, a circuit for performing the thumbnail processing may be used for performing other functions, such as the internet facsimile processing function as described above. In such a case, for example, a constraint condition such that the monochrome thumbnail image for display cannot be prepared during the transmission of the monochrome image data by, for example, the internet facsimile communication. Consequently, when the monochrome image in question has a turn to be displayed on the display unit as the thumbnail display, waiting time for display is generated, which makes the user wait.

In view of such problems described above, it is an object of the present invention to provide an image processing apparatus which is capable of reducing the time period until a thumbnail image is displayed when a module for performing the thumbnail processing is commonly used for functions other than the display.

In order to achieve the object described above, an image processing apparatus of the present invention includes a color reducing unit configured to generate color reduced image data from the color image data; a monochrome reducing unit configured to generate monochrome reduced image data from the monochrome image data; and a control unit configured to control the individual reducing units, wherein the control unit determines the order of usage of the individual reducing units on the basis of the state of usage of the individual reducing units by another function when generating the color reduced image data and the monochrome reduced image data for display.

The image processing apparatus of the present invention is characterized in that the another function is an internet facsimile function.

The invention is also characterized in that the color reducing unit and the monochrome reducing unit perform an image data reducing process in the file-to-file basis, and the control unit determines the order of usage of the individual reducing units in the file-to-file basis.

The image processing apparatus of the present invention is characterized in that the color reducing unit and the monochrome reducing unit perform the image data reducing process on the page-to-page basis, and the control unit determines the order of usage of the individual reducing units on the page-to-page basis. The image processing apparatus of the present invention is characterized in that the color reducing unit and the monochrome reducing unit perform the image data reducing process on the area-to-area basis in one page and the control unit determines the order of usage of the individual reducing units on the area-to-area basis in one page.

Assuming that the thumbnail images of the monochrome data and the color data are in the different paths respectively, when the request of thumbnail generation occurs with the monochrome and color images are mixed, for example, if the color path is being used by another application when a color image has a turn to be applied with the thumbnail processing, the thumbnail image is not generated and waiting time is generated. However, according to the image processing apparatus in the first embodiment of the present invention, when the request of thumbnail generation occurs in the state in which the monochrome and color images are mixed, the processing is performed first from the one which can be applied with the thumbnail processing and, if the color path is used by another application, the thumbnail processing is performed on the monochrome images in preference to the color image until the color path is opened, so that the user feels that the time until the images are processed and the thumbnail image is actually displayed is shorter than the case of processing in sequence, so that the feeling of inpatient is alleviated.

Other features, elements, processes, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
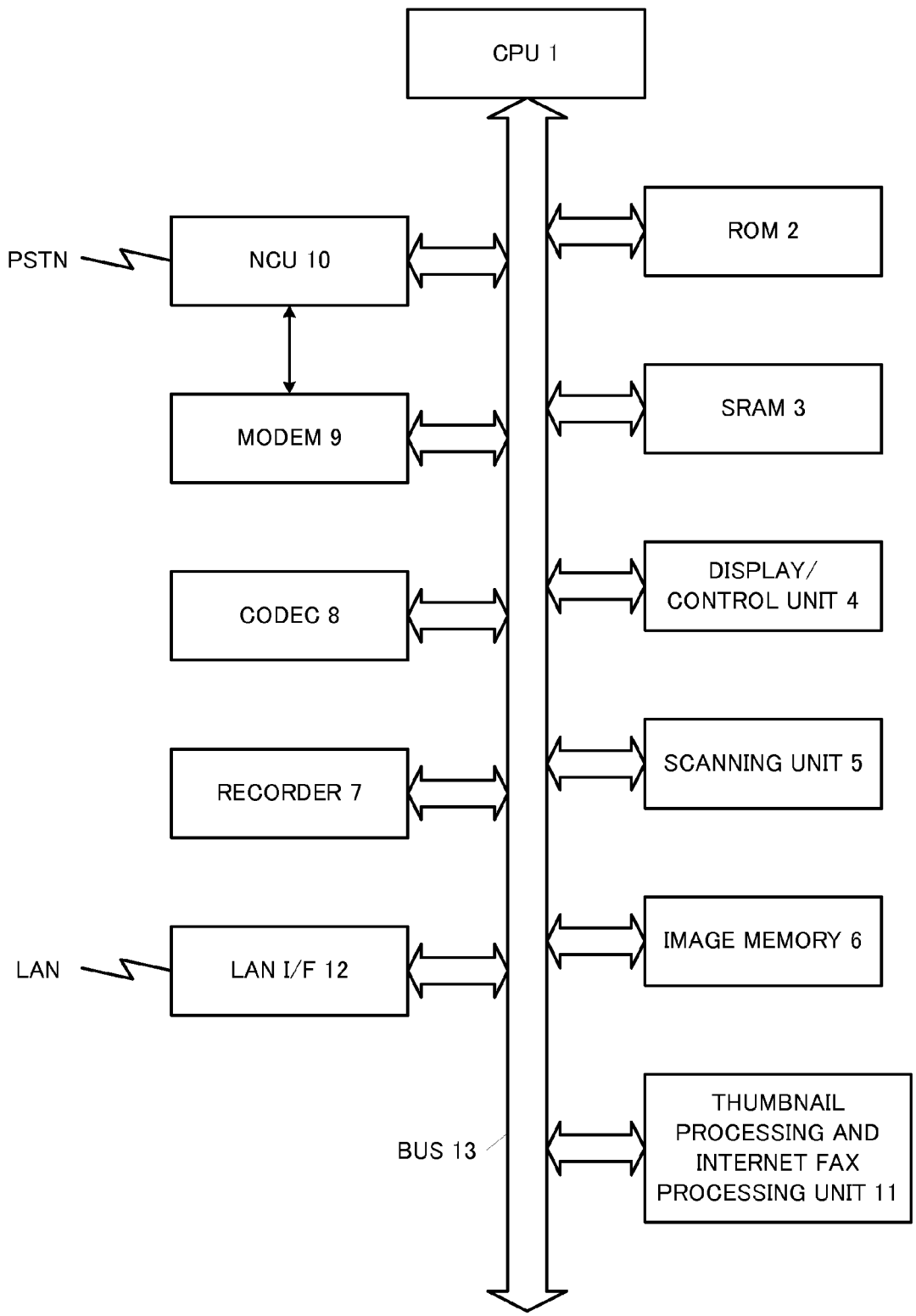
FIG. 1 is a block diagram showing a hardware configuration of a digital multifunction peripheral according to a first embodiment of the present invention.

An example in which an image processing apparatus of the present invention is applied to a digital multifunction peripheral will be described below. FIG. 1 is a block diagram showing a hardware configuration of the digital multifunction peripheral. The digital multifunction peripheral includes a CPU 1, a Read Only Memory (ROM) 2, a Static Random Access Memory (SRAM) 3, a display/control unit 4, a scanning unit 5, an image memory 6, a recorder 7, a codec 8, a modem 9, a Network Control Unit (NCU) 10, a thumbnail processing & internet FAX processing unit 11 and a local area network interface (LAN I/F) 12, and these units are connected via a bus 13.

The CPU 1 controls each unit of the hardware of the digital multifunction peripheral via the bus 13, and performs various programs on the basis of the program stored in the ROM 2. The ROM 2 stores various programs or operation message or the like required for the operation of the digital multifunction peripheral in advance, and the SRAM 3 stores a temporary data generated when executing the programs.

Figure 2:
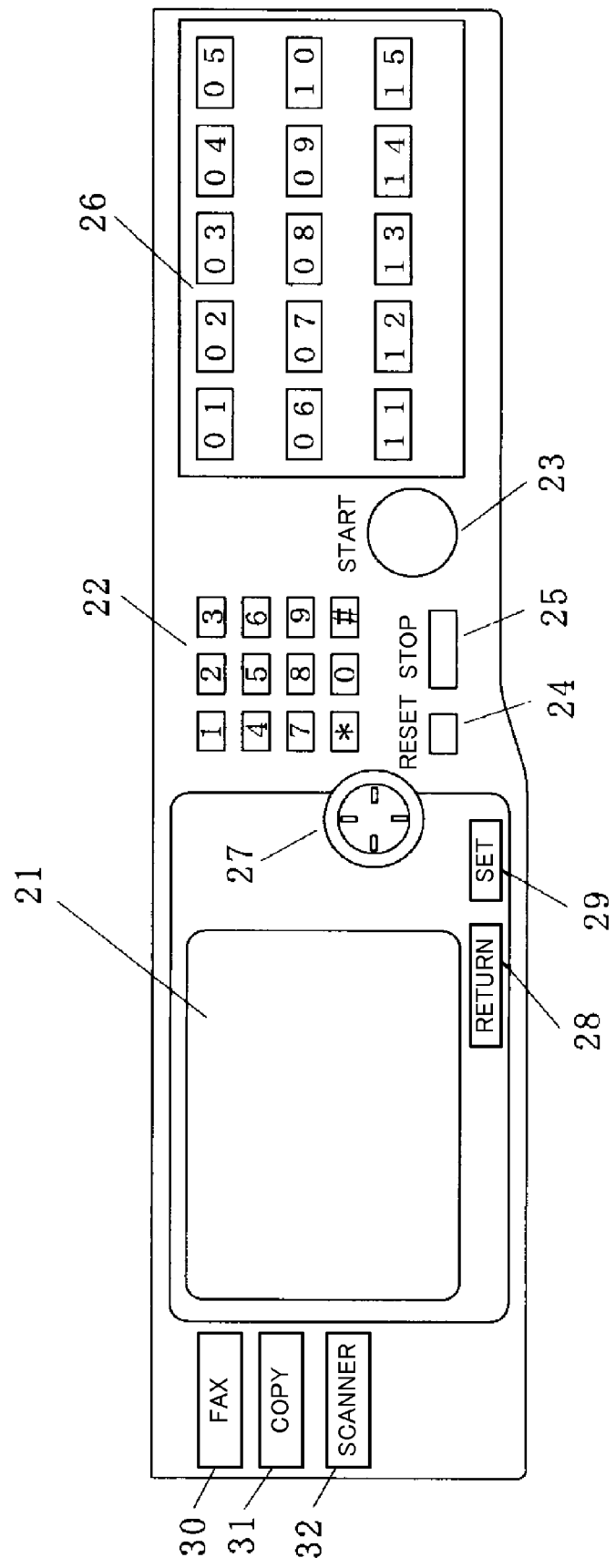
FIG. 2 illustrates a detailed configuration of a display/control unit of the digital multifunction peripheral according to the first embodiment of the present invention.

The display/control unit 4 includes a display unit for displaying the operating state of the digital multifunction peripheral or displaying an operation window for various functions and a plurality of keys for operating the digital multifunction peripheral and, as shown in FIG. 2, is composed of an LCD display unit 21 which constitutes the display unit and a number of operating keys. The LCD display unit 21 is provided with touch panel switches, and selection of a corresponding item or execution of the function are achieved by pressing the item portion displayed on the LCD display unit 21.

The operating key includes various keys such as a ten key 22, a start key 23, a reset key 24, a stop key 25, a plurality of one-touch dial keys 26, a cross key 27, a return key 28, a set key 29, a FAX switch key 30, a COPY switch key 31 and a SCANNER switch key 32. The LCD display unit 21 may be substituted for part or all of these operating keys.

Figure 3:
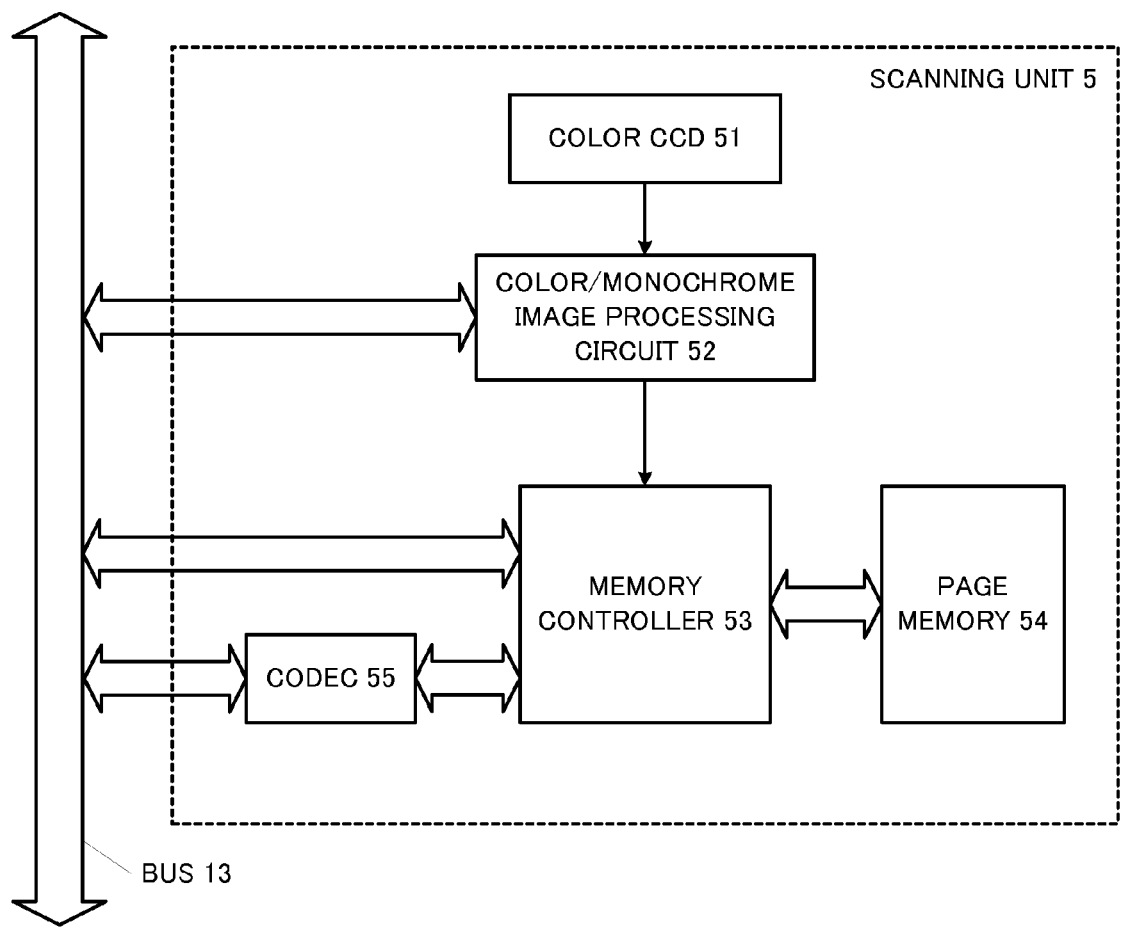
FIG. 3 is a block diagram showing a detailed configuration of a scanning unit of the digital multifunction peripheral according to the first embodiment of the present invention.

The scanning unit 5 includes a scanned document bed such as an automatic document feeder (ADF) or a flat bed scanner (FBS), and scans the document with the scanner and outputs dot image data. As shown in FIG. 3, the scanning unit 5 includes a color CCD 51, a color/monochrome image processing circuit 52, a memory controller 53, a page memory 54 and a codec 55.

The color CCD 51 is a four-channel CCD composed of R, G, B and K, and outputs three color signals R, G and B and one channel monochrome signal (B/W) by scanning the document. The color/monochrome image processing circuit 52 generates digital image data (8 bit) of monochrome and components in three colors R, G and B on the basis of the image signal from the color CCD 51, and converts the RGB image data to image data having three components of Y, C and C (luminance, color difference 1 and color difference 2), or Lab, which is a color display system isotropic for human visibility by a color conversion process, and the memory controller 53 accumulates these data in the page memory 54. The codec (for JPEG) 55 performs JPEG compression of the YCC multi-value data or Lab multi-value data accumulated in the page memory 54 or decompression of the compressed data.

The image memory 6 is composed of DRAM or the like and stores image data to be transmitted or received image data, or image data scanned by the scanning unit 5. The recorder 7 is provided with a printer device of an electrophotographic system and prints out received data, copy document or print data transmitted from the external personal computer or the like. The codec 8 performs the compression and decompression corresponding to a predetermined protocol, and compresses the image data of the scanned document in a MH, MR or MMR system for transmission, or decompresses the image data received from the outside.

The modem 9 is connected to the bus 13, and has a function as a facsimile modem which is able to perform the facsimile transmission, and the modem 9 is connected to the NCU 10 also connected to the bus 13. The NCU 10 is a hardware which performs closing and opening operations for the analogue line, and connects the modem 9 to the Public Switched Telephone Network (PSTN) as needed.

Figure 4:
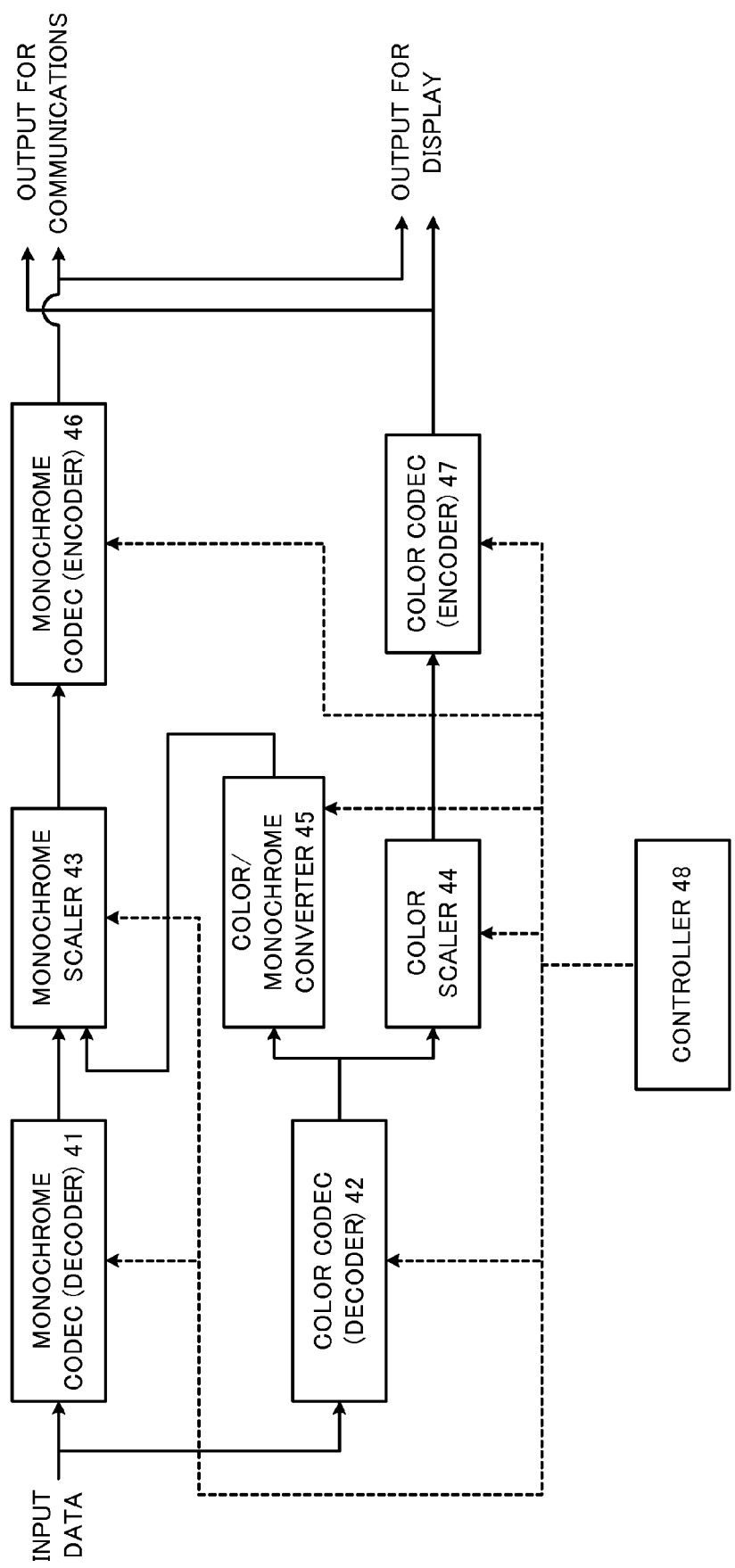
FIG. 4 is a block diagram showing a function of a thumbnail processing & internet FAX processing unit of the digital multifunction peripheral according to the first embodiment of the present invention.

On the other hand, the thumbnail processing & internet FAX processing unit 11 generates a thumbnail image reduced in size by skipping the pixels to reduce the number of pixels in the image data when displaying the thumbnail image. The processing unit 11 converts a file format of the image data into the TIFF system or the like used in an internet facsimile at the time of transmission of the internet facsimile. As shown in FIG. 4, the thumbnail processing & internet FAX processing unit 11 includes a monochrome codec (decoder) 41, a color codec (decoder) 42, a monochrome scaler 43, a color scaler 44, a color/monochrome converter 45, a monochrome codec (encoder) 46 and a color codec (encoder) 47, and these units are controlled by a controller 48.

The monochrome codec 41 and the color codec 42 decompress the compressed input image data and feed the same to the monochrome scaler 43, the color scaler 44 and the color/monochrome converter 45. The monochrome scaler 43 and the color scaler 44 reduce the monochrome image data or the color image data fed from the monochrome codec 41 and the color codec 42 and generate the thumbnail image data. The color/monochrome converter 45 generates the monochrome image data (for example, the concentration value data from "0" to "255") on the basis of the fed image data in individual colors of RGB, and feeds the generated monochrome image data into the monochrome scaler 43.

The monochrome codec 46 and the color codec 47 compress the monochrome image data fed from the monochrome scaler 43 or the color image data fed from the color scaler 44 and transfer the same to the display unit in the case of output for image display. It is also possible to skip the monochrome codec 46 and the color codec 47 and transfer the image data to the display unit without performing the compression. In this case, it is possible to eliminate the use of the decoder in the display unit.

On the other hand, in the case of output for communications, the monochrome codec 46 and the color codec 47 compress the monochrome image data fed from the monochrome scaler 43 or the color image data fed from the color scaler 44 and then convert the file format before outputting the same.

The thumbnail processing & internet FAX processing unit 11 is configured as described above. When the thumbnail processing is applied to the monochrome image data, the monochrome image data is decompressed by the monochrome codec 41 and is fed to the monochrome scaler 43, where the reduction of the image data is executed, and is compressed by the monochrome codec 46 before being outputted.

When the thumbnail processing is applied to the color image data, the color image data is decompressed by the color codec 42, is fed to the color scaler 44, where the reduction of image data is executed, and is compressed by the color codec 47 before being outputted. When the color image data is converted into the monochrome image data, the color image data is converted into the monochrome image data by the color/monochrome converter 45, is reduced in size by the monochrome scaler 43 when needed, and is compressed by the monochrome codec 46 before being outputted.

On the other hand, the LAN I/F 12 is connected to a network such as a LAN, is configured to receive signals such as the print data from the personal computer connected to the network and transmits a signal or data to the network, and performs interface processing such as the signal conversion or the protocol conversion.

The digital multifunction peripheral has a configuration as described above and, at the time of G3 facsimile transmission, the image data of the document is scanned by the scanning unit 5, is compressed by the codec 8 and is accumulated in the image memory 6. The compressed image data is taken out from the image memory 6, is modulated by the modem 9, and is transmitted to the communication destination from the NCU 10 via the PSTN. At the time of facsimile reception, the received image data is demodulated by the modem 9, is accumulated in the image memory 6, is decompressed by the codec 8, and is printed out by the recorder 7.

The digital multifunction peripheral is able to perform electronic mail transmission via a mail server or direct data transmission via an IP network as the internet facsimile transmission. In the case of the electronic mail transmission, the image data accumulated in the image memory 6 is fed to the thumbnail processing & internet FAX processing unit 11, is compressed if necessary, is applied with MMR compression or JPEG compression by the codec 46 or the codec 47 and with conversion to a file format which is attachable to the electronic mail, that is, the TIFF format file to prepare an attachment file for the electronic mail. Then, a normal electronic mail transmission is performed by transmitting a mail with the prepared attachment file to a mail address included in destination information.

In contrast, when the internet facsimile transmission is the direct data communication via the IP network, connection with an internet facsimile apparatus at the destination is established via the LAN I/F 12 and the LAN. When the connection is established, the image data to be transmitted, which is accumulated in the image memory 6 is fed to the thumbnail processing & internet FAX processing unit 11, is applied with compression and conversion to the TIFF format file, and is transmitted to the internet facsimile apparatus at the destination.

Figure 5:
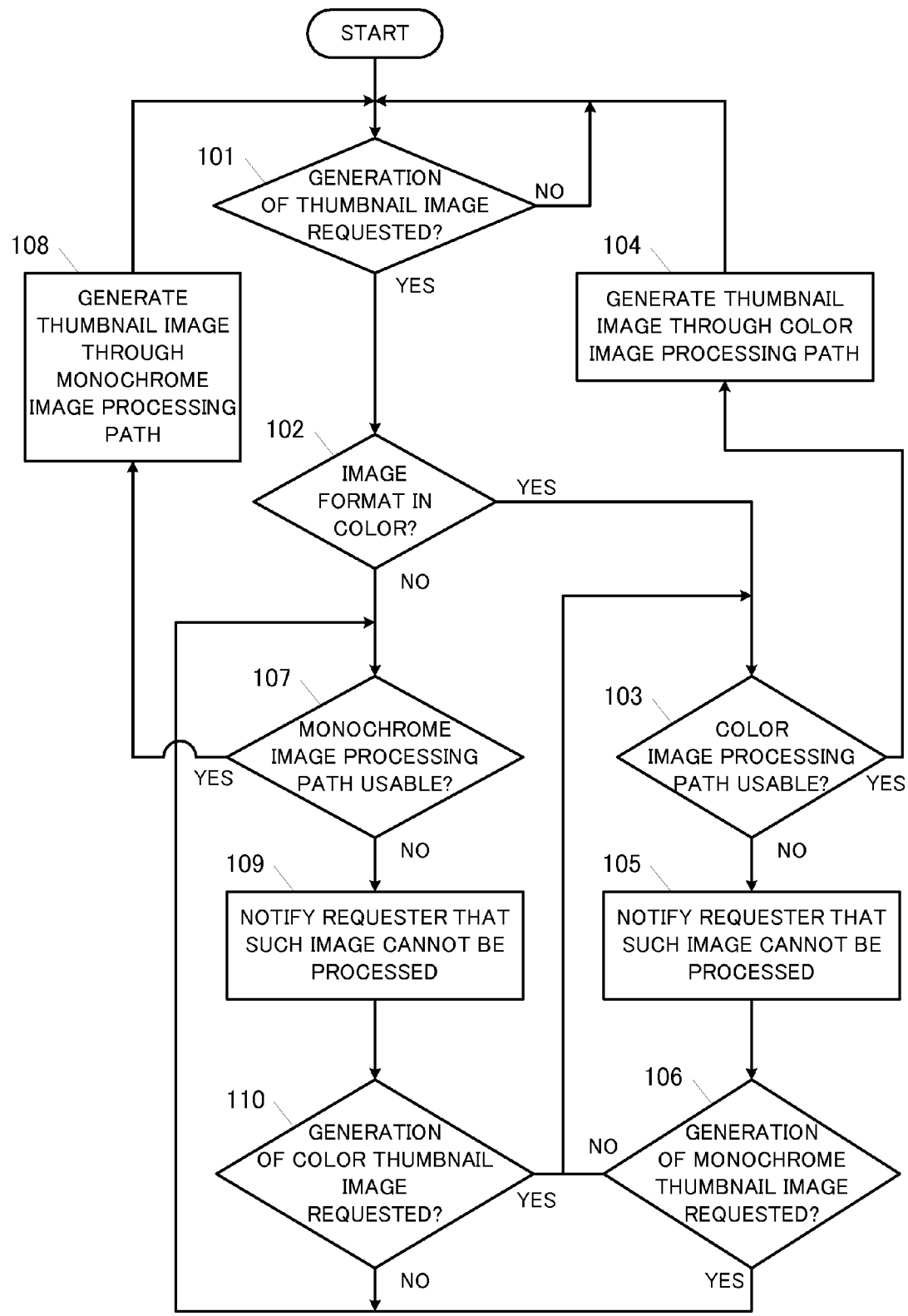
FIG. 5 is a flowchart showing an operation when performing the thumbnail processing for displaying the digital multifunction peripheral according to the first embodiment of the present invention.

The digital multifunction peripheral is able to display the thumbnail image of the image data scanned by the scanning unit 5 at the time of copying or the like on the LCD display unit 21 of the display/control unit 4. Referring now to a flowchart in FIG. 5, an operation of the thumbnail processing & internet FAX processing unit 11 at the time of generating the thumbnail image will be described. The controller 48 of the thumbnail processing & internet FAX processing unit 11 performs the thumbnail image generation program shown in the flowchart in FIG. 5, and determines whether of not generation of the thumbnail image is requested from the CPU 1 constantly when the power of the digital multifunction peripheral is turned ON (Step 101).

Then, when it is determined that the generation of the thumbnail image is requested from the CPU 1, the controller 48 determines whether the image format is color or not by determining whether the file to be applied with the image generation processing is a color file or a monochrome file (Step 102). When it is determined that the image format is color, whether or not the color image processing path, that is, the color codec 42, the color scaler 44 and the color codec 47 are usable is determined (Step 103).

When it is determined that the color image processing path is usable in Step 103, the controller 48 generates a thumbnail image through the color image processing path (Step 104) and, when the thumbnail image is generated, the procedure goes back to Step 101 and whether or not the generation of the thumbnail image is requested from the CPU 1 is determined again.

When it is determined that the color image processing path is not usable in Step 103, the controller 48 notifies that the processing of the image file in question cannot be performed to the CPU 1 (Step 105), then determines whether or not the generation of the thumbnail image of the monochrome file is requested from the CPU 1 (Step 106). When it is determined that the generation of the thumbnail image of the monochrome file is not requested from the CPU 1, the procedure goes back to Step 103, and determines whether or not the color image processing path is usable again.

In contrast, when it is determined that the image format is monochrome in Step 102, or when it is determined that the generation of the thumbnail image of the monochrome file is requested from the CPU 1 in Step 106, the controller 48 determines whether or not the monochrome image processing path, that is, the monochrome codec 41, the monochrome scaler 43 and the monochrome codec 46 are usable (Step 107). When it is determined that the monochrome image processing path is usable, the controller 48 generates the thumbnail image through the monochrome image processing path (Step 108) and, when the thumbnail image is generated, the procedure goes back to Step 101, and whether nor not the generation of the thumbnail image is requested from the CPU 1 is determined again.

In Step 107, when it is determined that the monochrome image processing path is not usable, the controller 48 notifies that the image file in question cannot be processed to the CPU 1 (Step 109), then determines whether or not the generation of the thumbnail image of the color file is requested from the CPU 1 (Step 110) and, when it is determined that the generation of the thumbnail image of the color file is not requested from the CPU 1, the procedure goes back to Step 107, and whether or not the monochrome image processing path is usable is determined and, when it is determined that the generation of the thumbnail image of the color file is requested from the CPU 1, the procedure goes back to the Step 103, and whether or not the color image processing path is usable is determined.

As described above, when the image data of the file in the monochrome format and the file in the color format is applied with the thumbnail processing, the thumbnail processing is performed from the one which is ready to be processed and, for example, when the color image processing path is used, the thumbnail processing is performed first to the monochrome image in preference to the color image until the color path is opened, so that the time required until the thumbnail image is actually processed and displayed is reduced to a level shorter than that in the case of processing in sequence.

In the example shown above, a case in which the image format is determined on the "file-to-file" basis has been described. However, the image processing apparatus of the present invention may be applied to a case of determining the image format on the "page-to-page" basis or in the "area-to-area basis in one screen (page)" and performing the thumbnail processing. When the image formats are mixed in the "area-to-area basis in one screen", different encoding systems exist in one page so that the color encoding data and the monochrome encoding data are unitized and filed. Therefore, when applying the thumbnail display processing to this file, the original file is decoded while being divided into the monochrome portion and the color portion, the image reducing process is performed while controlling the order for each area, and the color display data and the monochrome display data are combined again when these data are ready. In the case of the page unit as well, the image reducing process is performed while controlling the order for each page, and the color display data and the monochrome display data are combined into a file when these data are ready.

In the example shown above, the codecs 41, 42 and the codecs 46, 47 are provided for decompression and compression in the thumbnail processing & internet FAX processing unit 11. However, one each of the monochrome codec and the color codec may be provided respectively for causing the same to perform decompressing and compressing.

In the example shown above, the example in which the image processing apparatus of the present invention is applied to the digital multifunction peripheral has been described. However, the image processing apparatus of the present invention may be applied to other image processing apparatuses such as the copying machine.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. An image processing apparatus comprises:
 a color reducing unit configured to generate color reduced image data from color image data;
 a monochrome reducing unit configured to generate monochrome reduced image data from monochrome image data; and
 a control unit configured to control the individual reducing units,
 wherein the control unit determines the order of usage of the individual reducing units on the basis of the state of usage of the individual reducing units by another function when generating the color reduced image data and the monochrome reduced image data for display.

2. The image processing apparatus according to claim 1, wherein the another function is an internet facsimile function.

3. The image processing apparatus according to claim 1 or claim 2, wherein the color reducing unit and the monochrome reducing unit perform the image data reducing process in the file-to-file basis, and the control unit determines the order of usage of the individual reducing units in the file-to-file basis.

4. The image processing apparatus according to claim 1 or claim 2, wherein the color reducing unit and the monochrome reducing unit perform the image data reducing process on the page-to-page basis, and the control unit determines the order of usage of the individual reducing units on the page-to-page basis.

5. The image processing apparatus according to claim 1 or claim 2, wherein the color reducing unit and the monochrome reducing unit perform the image data reducing process on the area-to-are basis in one page, and the control unit determines the order of usage of the reducing units on the area-to-area basis in one page.

6. A method of controlling an image processing apparatus comprising the steps of:
 generating color reduced image data from color image data;
 generating monochrome reduced image data from monochrome image data; and
 determining the order of generation of the color or monochrome reduced image data when generating both the color reduced image data and the monochrome reduced image data for display.

7. The method of controlling an image processing apparatus according to claim 6, comprising determining the order of usage according to the operating state of an internet facsimile function.

8. The method of controlling an image processing apparatus according to claim 6 or claim 7, comprising performing the image data reducing process on the file-to-file basis; and determining the order on the file-to-file basis.

9. The method of controlling an image processing apparatus according to claim 6 or claim 7, comprising performing the image data reducing process on the page-to-page basis, and determining the order on the page-to-page basis.

10. The method of controlling an image processing apparatus according to claim 6 or claim 7, comprising performing the image data reducing process on the area-to-are basis in one page, and determining the order on the basis of the area-to-area basis in one page.

11. A non-transitory computer readable medium encoded with electronically readable control signals and being executed in cooperation with a programmable computing device such that a method of claim 6 is performed.

* * * * *